United States Patent [19]

Kanno

[11] Patent Number: 4,647,053
[45] Date of Patent: Mar. 3, 1987

[54] VEHICLE FOR USE ON INCLINED GROUND

[76] Inventor: Koh Kanno, 2203, Shibusawa, Hadano-shi, Kanagawa, Japan

[21] Appl. No.: 779,027

[22] Filed: Sep. 23, 1985

[30] Foreign Application Priority Data

Nov. 2, 1984 [JP] Japan .................. 59-232896

[51] Int. Cl.[4] ............................. B62D 37/00
[52] U.S. Cl. ......................... 280/6 R; 280/112 A
[58] Field of Search .......... 280/6 R, 112 A, 772, 280/755

[56] References Cited

U.S. PATENT DOCUMENTS 2,815,960 12/1957 Zapelloni ............... 280/112 A
2,960,941 11/1960 Li ............................ 280/112 A

FOREIGN PATENT DOCUMENTS 715362 8/1965 Canada ..................... 280/6 R

Primary Examiner—John J. Love
Assistant Examiner—Ross Weaver
Attorney, Agent, or Firm—Browdy and Neimark

[57] ABSTRACT

A vehicle for use on inclined ground includes a means for moving the center of gravity of a vehicle body, such as a deck, which is supported on a chassis frame. The means moves the vehicle body in the widthwise or lateral direction of the vehicle through a guide which extends laterally of the vehicle and has a curvature whose center is located at a point under the surface of the ground at which the perpendicular line which passes through the center of gravity of the vehicle body intersects the center line which passes through the center point between the right and left wheels or crawlers of the vehicle and which intersects the surface of the ground at right angles when the vehicle is in an inclined state.

1 Claim, 9 Drawing Figures

4,647,053

VEHICLE FOR USE ON INCLINED GROUND

BACKGROUND OF THE INVENTION

1. Field of the Invention

The present invention relates to a vehicle for use on inclined ground in a mountainous region or the like for such purposes as carrying felled timber. More particularly, the invention pertains to a vehicle for use on inclined ground in which the vehicle body, such as a deck, is supported on a chassis frame which is provided on both sides with wheels or crawlers which constitute propelling means in such a manner that the center of gravity of the vehicle body is movable.

2. Description of the Prior Art

Known prior arts related to the present invention include various types of suspension, that is, the pendulum suspension in which a vehicle body is pivotally connected to a chassis frame through a center pin as shown in FIG. 7, the parallelogram type shown in FIG. 8, and the type in which the vertical location of the wheels is changed as shown in FIG. 9. These prior arts, however, have advantages and disadvantages in terms of the distribution of weight on the crawler on the higher side (referred to as the "higher crawler", hereinafter) and the crawler on the lower side (referred to as the "lower crawler", hereinafter), and further, the ground conditions of the crawlers in states wherein the chassis frame is inclined.

The advantages and disadvantages of the prior arts will be described hereinunder in detail.

The pendulum suspension shown in FIG. 7 has the advantage that the crawlers invariably contact the ground over their entire lower surfaces when the chassis is inclined. However, since the center of gravity of the vehicle body is positioned on the perpendicular line n which passes through the center pin, this perpendicular line intersects the surface of the ground at a position closer to the lower crawler than the position at which the center line m which passes through the center point between the right and left crawlers intersects the surface of the ground at right angles. In more understandable terms, since the respective weights of both the chassis and the vehicle body are positioned on the downhill side, the sum total of these two weights acts on the vehicle in the downhill direction. As a result, the higher crawler has a lighter load than the lower crawler, which fact undesirably produces a difference in traction between the two crawlers, resulting in such problems as reducing the performance of the machine, risk of sideslip and damage to the surface of the ground.

On the other hand, the parallelogram type suspension shown in FIG. 8 and the suspension type wherein the vertical location of wheels is changed, shown in FIG. 9, have the advantage that the weight of the vehicle body is substantially uniformly distributed over the right and left crawlers even in a state wherein the chassis is inclined. However, in such a case, the area of contact of each crawler with the ground is undesirably decreased, and the ground pressure rises unfavorably, which fact disadvantageously involves the attendant risks of reducing traction, erosion of the ground and possible sideslip of the vehicle.

SUMMARY OF THE INVENTION

Accordingly, it is a primary object of the present invention to provide a vehicle for use on inclined ground which has the advantages of the above-described prior arts (shown in FIGS. 7 to 9) whereby the right and left crawlers are constantly brought into contact with the ground over their entire ground surfaces when the vehicle is in an inclined state and the weight of the vehicle body is uniformly distributed over both crawlers, thereby making it possible for the vehicle to travel on inclined ground in a stable condition at all times.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
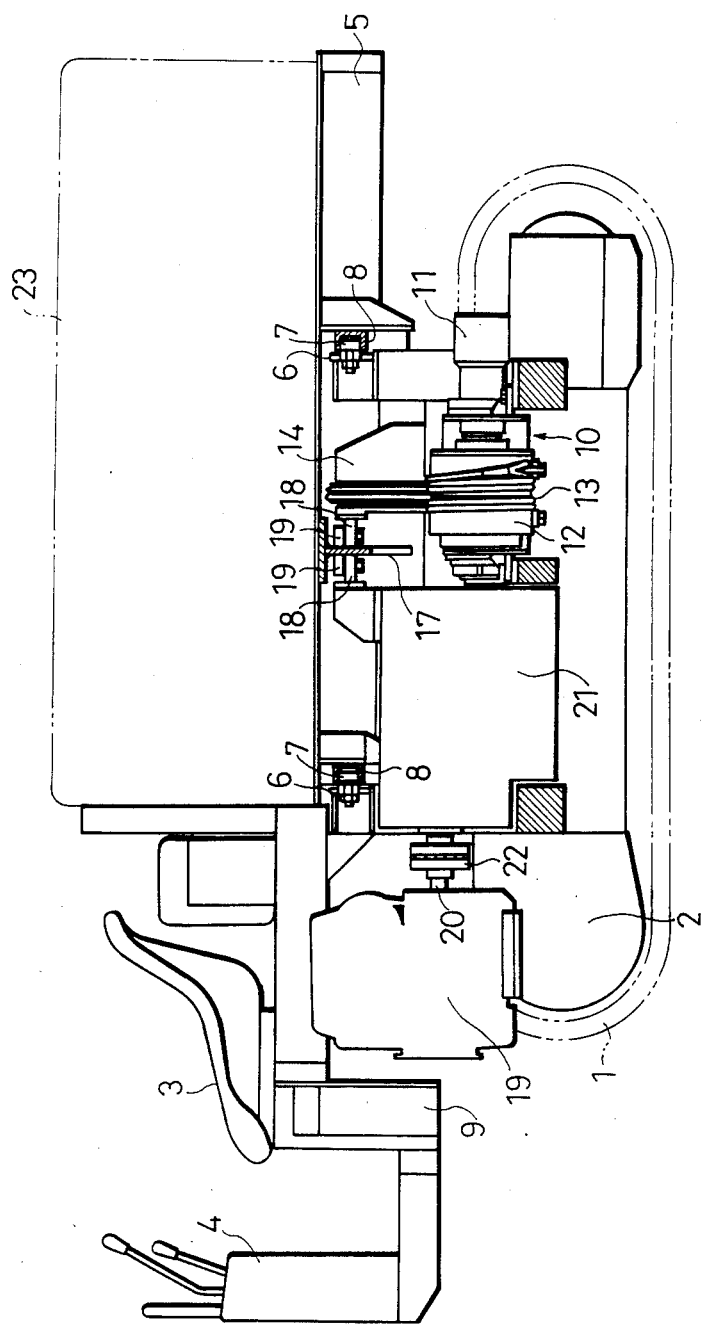
FIG. 1 is a side elevational view of the vehicle for use on inclined ground according to the present invention.
Figure 2:
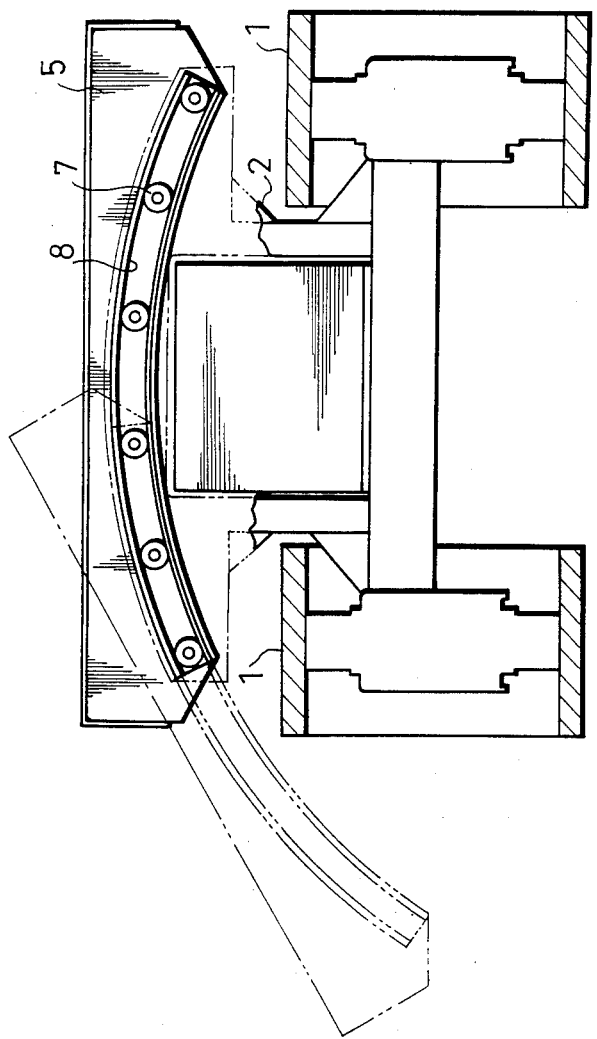
FIG. 2 is a front elevational view of one of the guide rail portions of the vehicle shown in FIG. 1.
Figure 3:
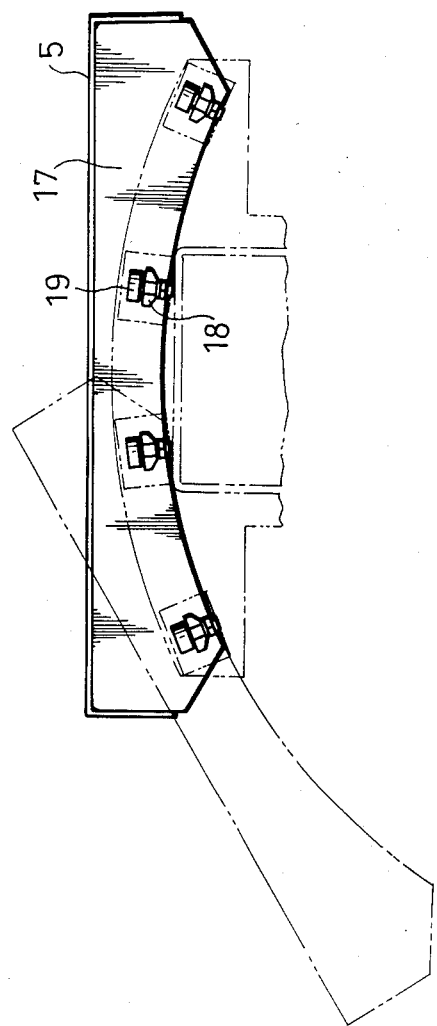
FIG. 3 is a front elevational view of the portion for restricting the forward and backward movement of the body of the vehicle shown in FIG. 1.
Figure 4:
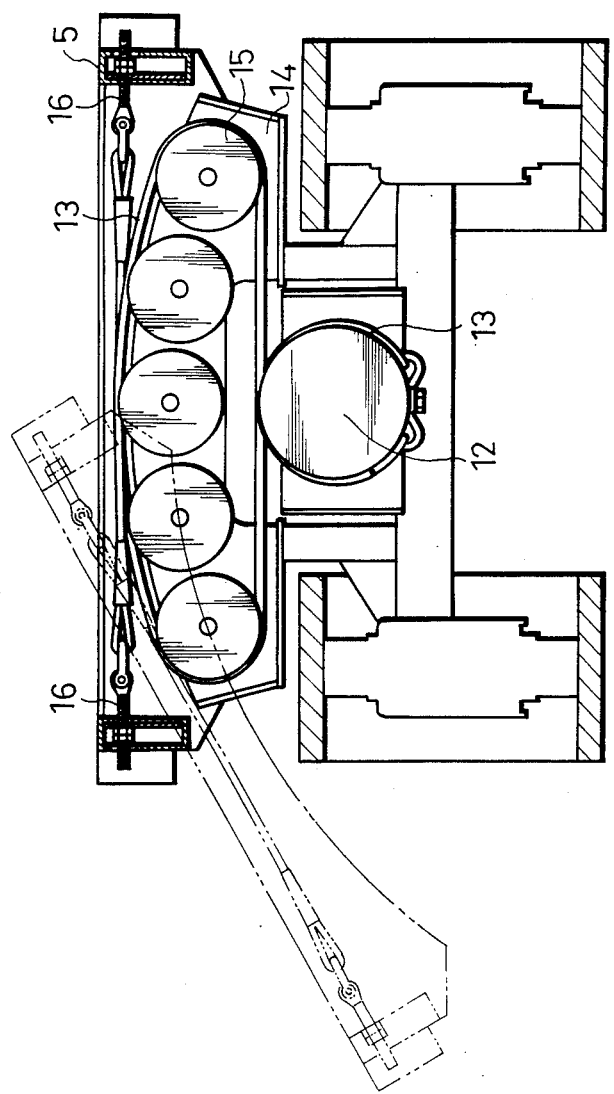
FIG. 4 is a front elevational view of the posture controlling drive means shown in FIG. 1.

A chassis frame 2 is provided on both sides with crawlers 1 which constitute propelling means. A vehicle body 5 is connected to the chassis frame 2 in such a manner as to be movable in the widthwise or lateral direction of the vehicle, the vehicle body 5 being constituted by a deck having a driver's seat and controls 4 disposed at its front end portion.

The vehicle body 5 and the chassis frame 2 are connected by the following means. Namely, brackets 6 are respectively provided at the front and rear end portions of the chassis frame 2. A group of a plurality of rollers 7 are disposed on each of the brackets 6 in such a manner as to be spaced at necessary intervals along an imaginary circular arc which extends laterally from the vehicle. Each group of rollers 7 are rollably engaged with a guide rail 8 which has a U-shaped cross-section and which is secured to the vehicle body 5 in such a manner as to extend laterally from the vehicle, thereby allowing the vehicle body 5 to move circularly in the lateral direction of the vehicle relative to the chassis frame 2.

The vehicle body 5 is provided at its front end portion with an inclination detector 9 of, for example, the pendulum type, which detects the degree of inclination of the vehicle when it is inclined. The chassis frame 2 is provided with a posture controlling drive means 10 for properly moving the vehicle body 5 in accordance with the detected signal which is delivered from the detector 9. The drive means 10 includes a reversible hydraulic motor 11 provided on the chassis frame 2. The drive shaft (not shown) of the motor 11 connected through a speed reduction mechanism (not shown) to a winding drum 12 which has its shaft rotatably carried by the chassis frame 2.

A plurality of turns of a wire 13 are wound on the drum 12, and the wire 13 is passed over a plurality of guide pulleys 15 which are rotatably supported by the vehicle body 5 through a support member 14, the wire 13 having both ends thereof respectively connected to retainers 16 which are disposed on both sides of the vehicle body 5.

Further, a restrictor plate 17 projects downwardly from the central portion of the vehicle body 5 in such a manner that the longitudinal axis of the plate 17 is orthogonal to that of the vehicle. Roller members 19 which are provided on the chassis frame 2 through respective brackets 18 are disposed such as to abut against the front and rear surfaces, respectively, of the plate 17 so that the plate 17 is clamped therebetween. Thus, the vehicle body 5 is prevented from moving longitudinally in relation to the vehicle.

The reference numeral 19 denotes an engine which is provided on the chassis frame 2. The output shaft 20 of the engine 19 is connected through a coupling 22 to a hydraulic pump (not shown) provided inside a hydraulic oil tank 21 which is mounted on the chassis frame 2. Thus, the hydraulic motor 11, which is connected to the winding drum 12, is driven by means of the hydraulic oil which is delivered from the above-described hydraulic pump. The hydraulic oil from the pump activated by the engine 19 is also employed to operate the crawler driving hydraulic motors (not shown) which are respectively connected to the right and left crawlers 1.

The reference numeral 23 represents a load on the vehicle body 5.

The following is a description of the operation of the above-described embodiment.

When the vehicle is inclined while running on inclined ground, the inclination detector 9 is actuated to deliver a signal, which causes the hydraulic motor 11 to be activated such as to rotate the winding drum 12, and the center of gravity of the vehicle body 5 is thereby moved toward the uphill side thereof by means of the wire 13 until the vehicle body 5 becomes horizontal as a result of weight balancing. When the vehicle body 5 is placed in a horizontal position, the hydraulic motor 11 stops.

On the other hand, when the vehicle comes to flat ground, the chassis frame 2 becomes horizontal, and the inclination detector 9 thereupon actuates the hydraulic motor 11 to operate in such a manner that the vehicle body 5 is restored to a horizontal position in its normal state.

Figure 6:
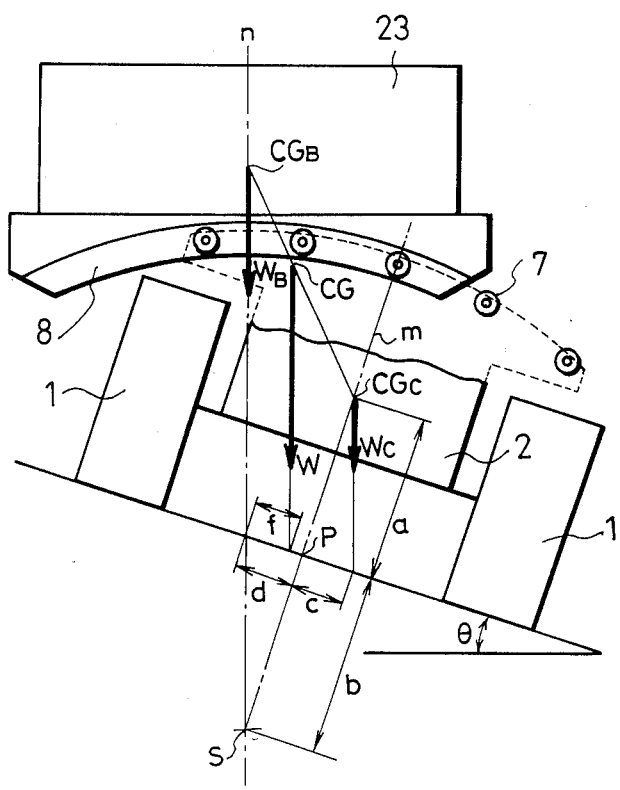
Figure 7:
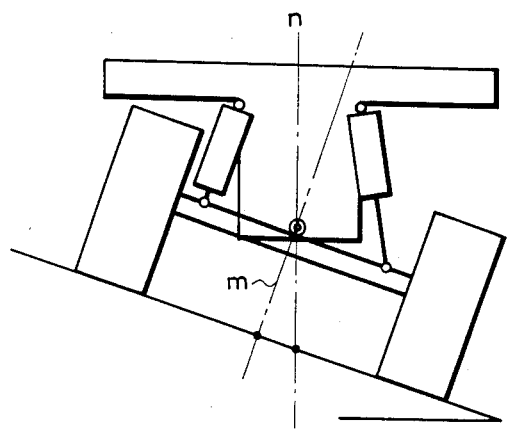
FIGS. 7 to 9 respectively illustrate prior arts.
Figure 8:
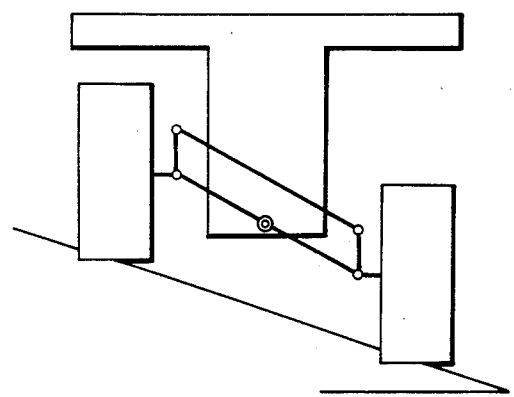
Figure 9:
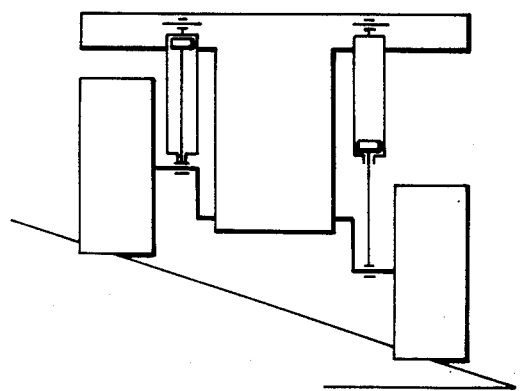

The feature of the present invention, which offers the above-described advantageous effects, resides in the arrangement in which each of the guide rails 8 is so formed as to have a curvature whose center is located at the point S under the surface of the ground at which the perpendicular line n and the center line m which passes through the center point between the right and left crawlers 1 and which intersects the surface of the ground at right angles when the vehicle is in an inclined state as shown in FIG. 6, and the vehicle body 5 is connected to the chassis frame 2 through the guide frames 8 as described above. By virtue of the above-described arrangement, when the vehicle is inclined, the perpendicular line n which passes through the center of gravity of the vehicle body 5 always intersects the surface of the ground at a position closer to the high crawler than the position P at which the center line m intersects the surface of the ground at right angles. More specifically, in the case of the pendulum suspension (shown in FIG. 7), the center of gravity of the vehicle body is positioned on the perpendicular line n which passes through the center pin and, therefore, the perpendicular line n intersects the surface of the ground at a position closer to the lower crawler than the position at which the center line m which passes through the center point between the right and left crawlers intersects the surface of the ground at right angles, as described at the beginning of this specification, thus always causing the entire weight of the vehicle to act in the downhill direction disadvantageously. According to the present invention, however, although the weight of the chassis frame is located at a position closer to the lower crawler, the center of gravity of the vehicle body is always at a position closer to the higher crawler. In total, therefore, it is possible for the weight of the vehicle to be uniformly distributed over the two crawlers 1. Further, both crawlers 1 are brought into contact with the ground over their entire ground surfaces when the vehicle is in an inclined state. Thus, the synergistic effect of the satisfactory ground contact condition and the uniform weight distribution advantageously makes it possible for the respective traction forces of the right and left crawlers to be made uniform. Accordingly, it becomes possible to eliminate such problems as reduced performance of the machine, risk of sideslip and damage to the ground, as described at the beginning of this specification.

It is also possible, according to the present invention, for the vehicle to travel on a steep slope and to set the overturn critical angle at a higher level by lowering the vehicle height as much as possible. Thus, the present invention provides a vehicle for use on inclined ground which adopts only the advantages of the prior arts whereby the right and left crawlers are constantly brought into contact with the ground over their entire ground surfaces when the vehicle is in an inclined state and the weight of the vehicle body is uniformly distributed over both the crawlers, thereby making it possible for the vehicle to travel on inclined ground in a stable condition at all times. Thus, the present invention has great merits which cannot be offered by conventional vehicles designed for use on inclined ground.

Practical examples of algebraic expressions in relation to the weight distribution over the right and left crawlers will be explained hereinunder.

Figure 5:
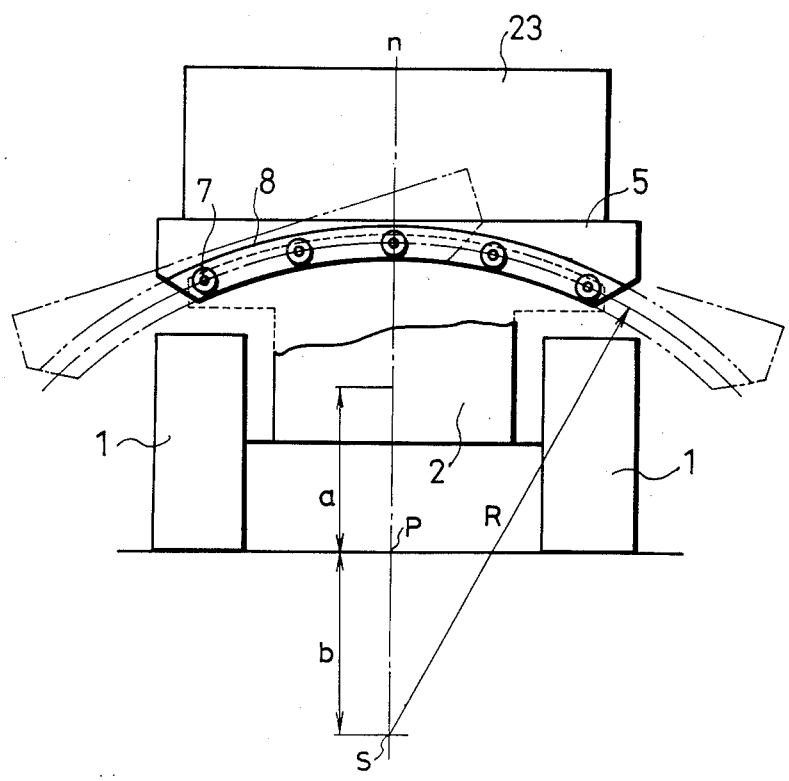
FIGS. 5 and 6 illustrate the operation of the present invention.

In FIGS. 5 and 6:

$\theta$ . . . the angle of inclination of the surface of the ground
a . . . the height of the center of gravity of the chassis
b . . . the distance of the center of curvature of the guide rail from the surface of the ground
$W_B$ . . . the weight of (the vehicle body + the driver + the load)
$W_C$ . . . the weight of the chassis
W . . . the entire weight of the vehicle ($=W_B+W_C$)
$CG_B$ . . . the center of gravity of $W_B$
$CG_C$ . . . the center of gravity of the chassis
CG . . . the center of gravity of W
c . . . the offset of $W_C$ toward the downhill side
d . . . the distance which the vehicle body moves toward the uphill side
f . . . the distance between W and $W_B$ on a slope
P . . . the center point between the crawlers
R . . . the radius of curvature of the guide rail $$c = a \tan \theta \quad (1)$$

$$d = b \tan \theta \quad (2)$$

$$f \cdot W_B = (c + d - f) W_C \quad (3)$$

From the formulae (1), (2) and (3), the following formula is obtained:

$$d - f = (bW_B - aW_C)\frac{\tan\theta}{W} \quad \text{(the deviation from } P\text{)} \quad (4)$$

In order to allow the weight to be uniformly distributed over the respective ground surfaces of the higher and lower crawlers, it is necessary for W to pass through the center point P between both the crawlers. In other words, the following condition must be satisfied in the formula (4):

$$d - f = 0$$

Accordingly, $$\frac{b}{a} = \frac{W_C}{W_B} \quad (5)$$

As will be understood from the formula (5), in the case of a vehicle in which $W_B$ does not vary, b takes a constant value; hence, the loads respectively imposed on the right and left crawlers are equal to each other irrespective of the angle of inclination.

On the other hand, in the case of a vehicle having a variable superimposed load, such as a cargo carrying vehicle, b is determined from the upper and lower limit values for b obtained by substituting into the formula (5) the upper and lower limit values for $W_B$ which are respectively measured when the vehicle is in an unloaded state and when it is in a maximumly loaded state. In consequence, W passes in the vicinity of the center point P, which fact involves a favorably small difference between the weights respectively distributed on the higher and lower crawlers.

Example of Calculation of Overturn Critical Angle In Accordance with the preferred Embodiment, where Q is the center of uphill crawler, constituting the origin of the coordinate which has the coordinate surface constituted by the ground contacting surface of crawler h is the height of center of gravity of $W_B$ at level ground l is the distance between two crawlers Referring to FIG. 6, the coordinate value of the center of gravity CHG is expressed as $(X_B, Y_B)$, so that the following conditions are met:

$$x_B = (b+h)\sin\theta + l/2 \ldots \quad (6)$$

$$Y_B = (b+h)\cos\theta - b \ldots \quad (7)$$

From the formulae (6) and (7), the coordinate values (x,y) of the gravity center CG of the vehicle are derived as follows:

$$x = (X_B - l/2) W_B/W = l/2 \quad (8)$$
$$= (b + h) W_B/W \sin\theta \, l/2$$

$$y = (Y_B - a) W_B/W + a \quad (9)$$
$$= \S(b + h) \cos\theta - (a + b)]W_B/W + a$$

From formulae (8) and (9), it will be understood that the values of x and y are increased and decreased, respectively, in accordance with an increase in the inclination angle $\theta$. This corresponds to the fact that, when the vehicle moves onto a slope, the distance between two crawlers is increased in accordance with the gradient of the slope so as to lower the position of the center of gravity.

The overturn critical angle, which is given as $\tan^{-1} x/y$ can be increased as the gradient, i.e., the angle, of the slope increases.

What is claimed is:

1. A vehicle for use on inclined ground in which a vehicle body which is, for example, constituted by a deck is supported on a chassis frame equipped with propelling means which are constituted by right and left wheels or crawlers in such a manner that the center of gravity of said vehicle body is movable in the widthwise or lateral direction of said vehicle, characterized in that means for moving the center of gravity of said vehicle body moves said vehicle body laterally of said vehicle through a guide which has a curvature whose center is located at a point under the surface of the ground at which the perpendicular line which passes the center of gravity of said vehicle body intersects the center line which passes through the center point between said right and left wheels or crawlers and which intersects the surface of the ground at right angles when said vehicle is in an inclined state.

* * * * *